United States Patent [19]

Dudgeon

[11] 4,275,190

[45] Jun. 23, 1981

[54] LATENT HEAT-CURABLE IODONIUM/COPPER SALT-CATALYZED EPOXY RESIN COMPOSITIONS

[75] Inventor: Charles D. Dudgeon, Clifton Park, N.Y.

[73] Assignee: General Electric Company, Schenectady, N.Y.

[21] Appl. No.: 110,372

[22] Filed: Jan. 8, 1980

[51] Int. Cl.$^3$ ............................................. C08G 59/68
[52] U.S. Cl. ................................... 528/361; 525/122; 528/89; 528/91; 528/92; 528/362
[58] Field of Search ................... 525/122; 528/89, 91, 528/92, 361, 362

[56] References Cited

U.S. PATENT DOCUMENTS

| | | | |
|---|---|---|---|
| 2,330,353 | 9/1943 | Menderson | 260/42 |
| 2,614,094 | 10/1952 | Wheelock | 260/45.5 |
| 2,646,417 | 7/1953 | Jennings | 260/45.5 |
| 3,894,113 | 7/1975 | Pagel | 525/122 X |
| 4,028,432 | 6/1977 | Dawans et al. | 525/122 X |
| 4,173,551 | 11/1979 | Crivello | 260/18 EP |
| 4,192,924 | 3/1980 | Crivello | 521/126 |

OTHER PUBLICATIONS

"Epoxy Resins", *Encyclopedia of Polymer Science & Technology*, 1967, Interscience Publishers, N.Y., vol. 6, pp. 209–271.

Rowe et al., "Toughening Thermosets with Liquid Butadiene/Acrylonitrile Polymers", Modern Plastics, vol. 47, p. 110 (1970).

Sultan et al., Polymer Engineering and Science, 13, 29 (1973).

*Primary Examiner*—Earl A. Nielsen
*Attorney, Agent, or Firm*—Morgan, Finnegan, Pine, Foley & Lee

[57] ABSTRACT

Epoxy resin compositions catalyzed with combinations of diaryliodonium salts of complex halogenides and copper salt catalyst activators are rendered stable at room temperature, but fully activatable at elevated temperatures by including an effective amount of a carboxyl terminated copolymer of butadiene and acrylonitrile, a hydroxy terminated copolymer of butadiene and acrylonitrile or a mixture thereof.

11 Claims, No Drawings

LATENT HEAT-CURABLE IODONIUM/COPPER SALT-CATALYZED EPOXY RESIN COMPOSITIONS

The present invention relates to epoxy resin compositions which are stable at normal temperatures, but curable rapidly on exposure to heat. More particularly, it concerns latent, heat curable compositions comprising epoxidic prepolymers, catalyzed with a combination of an iodonium complex salt and a copper salt, and stabilized with a carboxyl or hydroxy-terminated copolymer of butadiene and acrylonitrile.

BACKGROUND OF THE INVENTION

Crivello, U.S. Pat. No. 4,173,551, assigned to the assignee herein, discloses heat curable compositions of epoxidic prepolymers and aromatic onium salts such as diaryliononium salts in combination with various cocatalysts such as copper salts. Such compositions are useful to make, for example, protective, decorative and insulating coatings, potting compounds, printing inks, sealants, adhesives, molding compounds, wire insulation, textile coatings, laminates, impregnated tapes, varnishes, and the like. Such compositions are so highly active, however, that they tend to cure at room temperatures within a few days' time and this makes shelf storage somewhat of a problem. In applicant's copending United States patent application, Ser. No. 53,259, filed June 29, 1979, mineral filled such compositions are shown to be especially useful in filling, bridging or bonding substrates such as are encountered in the manufacture and repair of automobiles, and the like. Here, again, however, shelf-storage life is rather shorter than would be desired. The problem has been somewhat alleviated in the past by using a special form of the copper salt co-catalyst, namely, copper stearate, but this is not too satisfactory because such a salt must be milled into the epoxy in a separate operation.

In the said copending application, Examples 12 and 13 show the addition of, respectively, about 25 parts by weight per 100 parts of prepolymer of a carboxyl terminated copolymer of butadiene and acrylonitrile and of a hydroxy terminated copolymer of butadiene and acrylonitrile to a mineral-filled composition comprising epoxy resin prepolymer, a complex halonium salt and a copper salt, for the stated purpose of enhancing the flexibility of the cured composition. The disclosures of the patent and of the application are incorporated herein by reference.

It has now been discovered that the copolymers of butadiene and acrylonitrile mentioned-above, even in surprisingly small quantities, serve to stabilize such compositions against cure at normal temperature, but yet to permit rapid cure in the normal fashion at elevated temperatures. For example, a epoxidic ester prepolymer when catalyzed with as little as 1 percent of diphenyliodonium hexafluoroarsenate and 0.04 percent of copper naphthenate has a room temperature shelf life of only 2-3 days. The same composition, but with a small amount, e.g., 20 percent of a carboxyl- or hydroxy-terminated butadiene and acrylonitrile copolymer, has a room temperature shelf life of greater than twelve weeks. Even so, at 150° C., gel time is only 50 seconds, demonstrating the latent nature of the catalyst composition.

DESCRIPTION OF THE INVENTION

According to the present invention, there are provided polymerizable compositions comprising:
 (i) an epoxidic prepolymer;
 (ii) an effective amount of a catalyst precursor comprising an aromatic iodonium salt of a complex halogenide;
 (iii) a small but effective amount of a copper salt catalyst activator; and
 (iv) from a small but effective stabilizing amount up to about 150 parts by weight per 100 parts by weight of (i) of (a) a carboxyl terminated copolymer of butadiene and acrylonitrile, (b) a hydroxy terminated copolymer of butadiene and acrylonitrile, or (c) a mixture of (a) and (b).

The term "epoxidic prepolymer" when used herein and in the appended claims contemplates any of the conventional monomeric, dimeric, oligomeric or polymeric epoxy materials containing one or a plurality of epoxy functional groups. Preferably, they will be members of classes described chemically as (a) an epoxidic ester having two epoxycycloalkyl groups; (b) an epoxy resin prepolymer consisting predominately of the monomeric diglycidyl ether of bisphenol-A; (c) a polyepoxidized phenol novolak or cresol novolak; (d) a polyglycidyl ether of a polyhydric alcohol; (e) diepoxide of a cycloalkyl or alkylcycloalkyl hydrocarbon or ether; or (f) a mixture of any of the foregoing. To save unnecessarily detailed description, reference is made to the above-mentioned patent and the Encyclopedia of Polymer Science and Technology, Vol. 6, 1967, Interscience Publishers, New York, pages 209–271.

Suitable commercially available epoxidic esters are preferably, 3,4-epoxycyclohexylmethyl 3,4-epoxycyclohexanecarboxylate (Union Carbide ERL 4221, Ciba Geigy CY-179); as well as bis(3,4-epoxy-6-methylcyclohexylmethyl)adipate (Union Carbide ERL 4289); and bis(3,4-epoxycyclohexylmethyl)adipate (Union Carbide ERL 4299).

Suitable commercially available diglycidyl ethers of bisphenol-A are Ciba Geigy Araldite 6010, Dow Chemical DER 331, and Shell Chemical Epon 828 and 826.

A polyepoxidized phenol formaldehyde novolak prepolymer is available from Dow Chemical DEN 431 and 438, and a polyepoxidized cresol formaldehyde novolak prepolymer is available from Ciba-Geigy Araldite 538.

A polyglycidyl ether of a polyhydric alcohol is available from Ciba Geigy, based on butane-1,4-diol, Araldite RD-2; and from Shell Chemical Corp., based on glycerine, Epon 812.

A suitable diepoxide of an alkylcycloalkyl hydrocarbon is vinyl cyclohexene dioxide, Union Carbide ERL 4206; and a suitable diepoxide of a cycloalkyl ether is bis(2,3-epoxycyclopentyl)-ether, Union Carbide ERL 0400.

The catalyst precursor can be used in amounts of from 0.2 to 35, preferably from 0.5 to 15 parts by weight per 100 parts by weight of epoxidic prepolymer (i).

The aromatic iodonium salts of complex halogenides used as component (ii) are described in the above-mentioned U.S. Pat. No. 4,173,551. Illustrative iodonium salts have the following general structure:

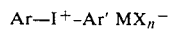

wherein Ar and Ar' are substituted or non-substituted aromatic radicals, and $MX_n^-$ is a complex metal halide in which M is B, As, Sb, P, and the like, and X is Cl−, Br− or F−, and n is from 4 to 7. Typical such salts are 4,4'-dimethylphenyliodonium hexafluoroarsenate, 4,4'-di-t-butyl-diphenyliodonium hexafluoroarsenate, diphenyliodonium hexafluoroarsenate, diphenyliodonium hexafluorophosphate, diphenyliodonium hexafluoroantimonate, diphenyliodonium tetrafluoroborate, and the like. Preferably, the iodonium salt will comprise diphenyliodonium hexafluoroarsenate or diphenyliodonium hexafluorophosphate, and, especially preferably, the former.

An essential component in the compositions is a copper salt catalyst activator (iii). At least an effective amount will be used, which can be experimentally determined with ease by those of ordinary skill in this art. Preferably, it will comprise from about 0.05 to 20 parts, and especially preferably from about 0.1 to 10 parts, by weight per 100 parts by weight of said catalyst precursor combination (ii).

The copper salts will be any of those described in the above-mentioned patent, U.S. Pat. No. 4,173,551 or application No. 053,259 especially a copper halide, e.g., bromide, chloride, or copper stearate, copper gluconate, copper citrate, copper naphthenate, and the like. Especially preferably, copper naphthenate will be used.

The carboxyl-terminated copolymer of butadiene and acrylonitrile (CTBN) and the hydroxy-terminated copolymer of butadiene and acrylonitrile (HTBN), components (iv) are made by procedures known to those in this art. For example, butadiene and acrylonitrile can be copolymerized with a metallic catalyst and terminated with hydroxyl groups or carboxyl groups, after reaction with suitable precursor compounds. See also E. H. Rowe, et al., Modern Plastics, Vol. 47, page 110 (1970) and F. J. McGarry, Polymer Engineering and Science, Vol. 13, page 29, (1973). Patent references are U.S. Pat. Nos. 2,330,353; 2,614,094; and 2,646,417; all of which are incorporated herein by reference. The copolymers are also available commercially from B. F. Goodrich Chemical Co., under the tradenames CTBN and HTBN. The amounts of component (iv) used will generally be from about 0.1 up to about 150 parts by weight, preferably from about 0.1 to about 50 parts by weight, per 100 parts by weight of epoxidic ester (i) present in the composition.

The latent, heat curable compositions of the present invention can be made by blending the epoxidic prepolymer with at least an effective amount (i.e., at least about 0.1% by weight) of the diaryliodonium salt and in further combination with the copper salt and the butadiene-acrylonitrile copolymer. The resulting curable composition can be in the form of a varnish having a viscosity of from 1 to 100,000 centipoises at 25° C. or a free flowing powder, depending upon the nature of the epoxide prepolymer. The latent, curable compositions can be applied to a variety of substrates by conventional means and cured, e.g, by exposure to heat and/or radiation, e.g., incandescent, or uv lamps, and the like, at 100° C. and above, to a tack-free state within 0.5 to 20 minutes, depending upon the temperature employed.

In certain instances, an organic solvent, such as nitromethane, acetonitrile, etc., can be used to facilitate the mixing of various ingredients. The diaryliodonium salts can be formed in situ if desired. In addition, the latent heat curable compositions may contain inactive ingredients, such as silica, talc, clay, glass fibers, extenders, hydrated alumina, carbon fibers, process aids, etc., in amounts up to 500 parts per 100 parts of epoxidic prepolymer (i). The curable compositions can be formed into self-supporting sheets, tapes, molded articles, etc., or they can be applied to substrates, such as metal, rubber, plastic, films, paper, wood, glass, cloth, concrete, ceramic, and the like.

DESCRIPTION OF THE PREFERRED EMBODIMENTS

The following examples illustrate compositions according to the present invention. They are not be be construed to limit the claims in any manner whatsoever.

EXAMPLE 1

The following ingredients are thoroughly mixed in a glass jar:

| Composition | Parts by Weight |
| --- | --- |
| 3,4-epoxycyclohexyl 3,4-epoxy cyclohexane carboxylate[a] | 19.8 |
| hydroxy terminated butadiene acrylonitrile copolymer[b] | 5.0 |
| diphenyliodonium hexafluoroarsenate (50% in methyl ethyl ketone) | 1.5 |
| Copper naphthenate (8% copper) | 0.2 |

[a]Union Carbide ERL 4221
[b]B. F. Goodrich HTBN

A portion is stirred on a hot plate at 150° C., and it cures to a solid mass in 50 seconds. The shelf life of the remainder at about 23° C. is greater than twelve weeks. Without the HTBN, the shelf life is less than 3 days.

EXAMPLES 2–4

Thoroughly mixed are the following ingredients. For comparison, compositions are made without the copolymer stabilizer. The results are set forth as follows:

| Example | 2 | 2A* | 3 | 3A* | 4 |
| --- | --- | --- | --- | --- | --- |
| Compositions (parts by weight) | | | | | |
| 3,4-epoxycyclohexyl 3,4-epoxycyclohexane carboxylate[a] | 96.6 | 96.6 | — | — | — |
| epoxidic prepolymer Epon 826[b] | — | — | 100 | 100 | 100 |
| hydroxy terminated butadiene acrylonitrile copolymer[c] | 1.0 | — | 1.0 | — | — |
| carboxyl terminated butadiene acrylonitrile terpolymer[d] | — | — | — | — | 1.0 |
| diphenyliodonium hexafluoroarsenate | 2.0 | 2.0 | 2.0 | 2.0 | 2.0 |
| copper naphthenate (8% copper) | 0.6 | 0.6 | 0.6 | 0.6 | 0.6 |
| Shelf Life | | | | | |
| Gel at 150° C. | 2.7 min. | 1.6 min. | 7.8 min. | 2.5 min. | 7.9 min. |
| at 60° C. | 6 hrs. | 20 min. | 15 days | <1 hr. | 23 days |
| at 25° C. | 19 days | 2 days | >16 weeks | 2 days | >16 weeks |

[a]Union Carbide ERL 4221
[b]Shell Chemical Co. Epon 826
[c]B. F. Goodrich HTBN
[d]CTBN/bisphenol-A diglycidyl ether containing 40 wt. % CTBN Heloxy 8006 from Wilmington Chemical Co.

The stabilizing effect of CTBN and HTBN at 25° C. can readily be seen.

To demonstrate the enhanced stability of the compositions according to this invention in comparison with the prior art, gel times over a range of four temperatures are measured and compared with the following results:

| Temperature, °C. | Gel Time, minutes | |
|---|---|---|
| | Control 3A | Example 4 |
| 150 | 2.5 | 7.9 |
| 130 | 3.0 | 24.5 |
| 120 | 4.2 | 48.1 |
| 100 | 8.4 | >127 |

The composition according to this invention (Example 4) has enhanced stability as high as 130° C. The gel time at 100° C. of longer than 2 hours, makes this composition useful in resin rich mica tapes for insulating electric motors and generators. In such applications, it is conventional to apply the insulation, heat to 100° C. to bake out any moisture present, then heat to temperatures in excess of 150° C. to allow the resin to flow and cure. This cannot be done with the unstabilized material but can be done with the composition stabilized according to this invention. That this stabilized material does cure to the same extent as the material without the CTBN can also be shown by measuring the heat distortion temperature (HDT). A bar, 5"×0.5"×0.5" is prepared with 3A by gelling for 1 hour at 80° C., then postbaking for 30 minutes at 175° C. The HDT of this control sample is 150° C. at 266 psi. A sample according to this invention (Example 4) is gelled for 90 minutes at 130° C., then cured for 1 hour at 175° C. The HDT is an entirely acceptable 145° C. at 266 psi.

It is obvious that many variations will suggest themselves in light of the above, detailed description. All such obvious variations are within the full intended scope of the appended claims.

I claim:

1. A polymerizable composition comprising:
   (i) an epoxy resin;
   (ii) an effective amount of a catalyst precursor comprising an aromatic iodonium salt of a complex halogenide;
   (iii) a small but effective amount of a copper salt catalyst activator; and
   (iv) from a small but effective stabilizing amount up to about 150 parts by weight per 100 parts by weight of (i) of (a) a carboxyl terminated copolymer of butadiene and acrylontrile, (b) a hydroxy terminated copolymer of butadiene and acrylonitrile, or (c) a mixture of (a) and (b).

2. A composition as defined in claim 1 wherein said epoxy resin is selected from
   (a) an epoxide ester having two epoxy—cycloalkyl groups;
   (b) an epoxy resin prepolymer consisting predominantly of the monomeric diglycidyl ether of bisphenol-A;
   (c) a polyepoxidized phenol novolak or cresol novolak;
   (d) a polyglycidyl ether of a polyhydric alcohol;
   (e) a diepoxide of a cycloalkyl or alkylcycloalkyl hydrocarbon or ether; or
   (f) a mixture of any of the foregoing;

3. A composition as defined in claim 2 wherein said epoxidic ester (i)(a) is 3,4-epoxycyclohexyl 3,4-epoxycyclohexane carboxylate.

4. A composition as defined in claim 1 wherein said catalyst precursor component (ii) and catalyst activator (iii) together comprise from about 0.5 to about 15 parts by weight per 100 parts by weight of epoxy resin (i).

5. A composition as defined in claim 1 wherein said catalyst precursor component (ii) comprises diphenyliodonium hexafluoroarsenate.

6. A composition as defined in claim 1 wherein said copper salt catalyst activator (iii) comprises from 0.1 to 10 parts by weight per 100 parts by weight of said catalyst precursor component (ii).

7. A composition as defined in claim 1 wherein said copper salt catalyst activator (iii) comprises a copper halide, copper benzoate, copper stearate, copper gluconate, copper citrate, copper naphthenate or a mixture of any of the foregoing.

8. A composition as defined in claim 7 wherein said copper salt catalyst activator (iii) comprises copper naphthenate.

9. A composition as defined in claim 1 wherein said stabilizer component (iv) comprises from about 0.1 to about 50 parts by weight per 100 parts by weight of said epoxy resin (i).

10. A composition as defined in claim 1 wherein said stabilizer component (iv) is a carboxyl terminated copolymer of butadiene and acrylonitrile.

11. A composition as defined in claim 1 wherein said stabilizer component (iv) is a hydroxy terminated copolymer of butadiene and acrylonitrile.

* * * * *

UNITED STATES PATENT AND TRADEMARK OFFICE
CERTIFICATE OF CORRECTION

PATENT NO. : 4,275,190
DATED : June 23, 1981
INVENTOR(S) : Charles D. Dudgeon

It is certified that error appears in the above-identified patent and that said Letters Patent are hereby corrected as shown below:

In column 6, line 5, "epoxide" should read -- epoxidic --.

Signed and Sealed this

Fifteenth Day of December 1981

|SEAL|

Attest:

GERALD J. MOSSINGHOFF

*Attesting Officer*  *Commissioner of Patents and Trademarks*